US009735836B2

(12) United States Patent
Van Wageningen

(10) Patent No.: US 9,735,836 B2
(45) Date of Patent: Aug. 15, 2017

(54) WIRELESS INDUCTIVE POWER TRANSFER

(71) Applicant: KONINKLIJKE PHILIPS N.V., Eindhoven (NL)

(72) Inventor: Andries Van Wageningen, Wijlre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 393 days.

(21) Appl. No.: 14/408,697

(22) PCT Filed: Jun. 20, 2013

(86) PCT No.: PCT/IB2013/055073
§ 371 (c)(1),
(2) Date: Dec. 17, 2014

(87) PCT Pub. No.: WO2014/001983
PCT Pub. Date: Jan. 3, 2014

(65) Prior Publication Data
US 2015/0155918 A1 Jun. 4, 2015

Related U.S. Application Data

(60) Provisional application No. 61/665,989, filed on Jun. 29, 2012.

(30) Foreign Application Priority Data

Apr. 3, 2013 (EP) .................... 13162077

(51) Int. Cl.
H01F 38/00 (2006.01)
H04B 5/00 (2006.01)
H02J 5/00 (2016.01)
(52) U.S. Cl.
CPC ............ H04B 5/0037 (2013.01); H02J 5/005 (2013.01); H04B 5/0031 (2013.01)

(58) Field of Classification Search
USPC .......................................... 307/104
See application file for complete search history.

(56) References Cited

U.S. PATENT DOCUMENTS

2010/0013322 A1 1/2010 Sogabe
2010/0049718 A1 2/2010 Aronovich
(Continued)

FOREIGN PATENT DOCUMENTS

CN 101662312 A 3/2010
CN 202821919 U 3/2013
(Continued)

OTHER PUBLICATIONS

Qi System Description Wireless Power Transfer, vol. 1: Low Power, Part 1 Interface Definition, Version 1.1, Mar. 2012.
(Continued)

Primary Examiner — Rexford Barnie
Assistant Examiner — Dru Parries
(74) Attorney, Agent, or Firm — Larry Liberchuk

(57) ABSTRACT

An inductive power transfer system comprises a power transmitter (101) and a power receiver (105). The power transmission system supports two-way communications. The power receiver (105) first initiates a mandatory configuration phase by transmitting a signal strength package and the power transmitter and receiver then operates (505, 507) the mandatory configuration phase wherein a first set of power transfer operating parameters are selected for the power transmitter (101) and the power receiver (105). The power receiver (105) subsequently transmits (509) a request to enter a negotiation phase and the power transmitter (101) acknowledges (511) the request by transmitting an acknowledgement. It then enters the negotiation phase. The power receiver (105) enters the negotiation phase in response to receiving the acknowledgment message. The power receiver
(Continued)

(105) and power transmitter (101) then determines (513, 515) a second set of operating parameters by performing the negotiation phase. The approach is particularly suitable for a Qi power transfer system.

23 Claims, 7 Drawing Sheets

(56) References Cited

U.S. PATENT DOCUMENTS

| | | |
|---|---|---|
| 2010/0181961 A1 | 7/2010 | Novak |
| 2010/0187912 A1 | 7/2010 | Kitamura et al. |
| 2011/0050164 A1 | 3/2011 | Partovi |
| 2013/0062961 A1* | 3/2013 | Park ........................ H02J 50/12 307/104 |

FOREIGN PATENT DOCUMENTS

| | | |
|---|---|---|
| JP | 2000332644 A | 11/2000 |
| JP | 2006081249 A | 3/2006 |
| JP | 2010028936 A | 2/2010 |
| WO | WO2010093723 A1 | 8/2010 |
| WO | 2012049582 A1 | 4/2012 |

OTHER PUBLICATIONS

System Description Wireless Power Transfer vol. II: Medium Power Part 1: Interface Definition Version 0.9 Dec. 2012.

Daniel Teninty et al., "7575 Fulton Street East—MS Wireless Power Consortium", Nov. 2, 2010, XPO55088429, Retrieved from the Internet: URL:http://www.energy.ca.gov/appli ances/battery_chargers/documents/2010-10II_workshop/comments.

"PHY arid MAC Layer Protocols of in-band 1-23 Wireless Communication for Wireless Power Transfer System", TTA Standard,Jun. 12, 2012, XP055088519,Internet Retrieved from the Internet: URL:http://www.tta.or.kr/Engli sh/new/standardization.

Koulian Jiang et al.,"Modeling Analysis of Wireless Power Transmission System", Image and Signal Processing (CISP), 2011 4th International Congress on, IEEE, Oct. 15, 2011 (Oct. 15, 2011), pp. 194-197, XP032070677.

"System Description, Wireless Power Transfer, vol. I: Low Power, Part 1: Interface Definition, Version 1.0 Jul. 2010", published by the Wireless Power Consortium available via http://www.wirelesspowerconsortium.com/downloads/wireless-power-specification-part-1.html, also called the Qi wireless power specification, in particular chapter 6: Communications Interface.

* cited by examiner

WIRELESS INDUCTIVE POWER TRANSFER

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 the Qi wireless power specification (version 1.0).

Although Qi uses a unidirectional communication link, it has been proposed to introduce communication from the power transmitter to the power receiver. However, such a bidirectional link is not trivial to include and is subject to a large number of difficulties and challenges. For example, the resulting system still needs to be backwards compatible and e.g. power transmitters and receivers that are not capable of bidirectional communication still need to be supported. Furthermore, the technical restrictions in terms of e.g. modulation options, power variations, transmission options etc are very restrictive as they need to fit in with the existing parameters. It is also important that cost and complexity is kept low, and e.g. it is desirable that the requirement for additional hardware is minimized, that detection is easy and reliable, etc. It is also important that the communication from the power transmitter to the power receiver does not impact, degrade or interfere with the communication from the power receiver to the power transmitter. Furthermore, an all-important requirement is that the communication link does not unacceptably degrade the power transfer ability of the system.

Accordingly, many challenges and difficulties are associated with enhancing a power transfer system such as Qi to include bidirectional communication.

System Control

In order to control the wireless power transfer system, the Qi standard specifies a number of phases or modes that the system may be in at different times of the operation. More details can be found in chapter 5 of part 1 the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense to detect a possible presence of an object. Similarly, the receiver will wait for the presence of a power signal.

Ping Phase

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

The system allows for an efficient setup and operation of the power transfer. However, the approach is restrictive and may not allow the full desired flexibility and support for functions as required. For example if a power receiver tries to get more than 5 W power from a power transmitter the power transmitter may terminate power transfer resulting in a bad user experience. Therefore, it is desirably to further develop the Qi standard to provide enhanced functionality, flexibility and performance.

In particular the unidirectional communication may be restrictive. Indeed, this requires that the power transmitter must be able to comply with any request by the power receiver and thus further requires the power receiver to be limited to only request parameters that it knows can be met by all power transmitters. Such an approach complicates or prevents further development of functionality as it will result in a lack of backwards compatibility.

However, as previously mentioned, the introduction of bidirectional communication in power transfer systems such as Qi systems is complicated and subject to many restrictions and requirements in order to ensure both efficient power transfer, efficient operation and not least backwards compatibility.

The existing system provides only limited operational flexibility and customization options. In particular, the adaptation of operating parameters is restricted to a limited set of parameters. For example, the identification and configuration phase allows some operating parameters to be adapted to the specific power receiver. However, the number of parameters that can be adapted is limited. This may restrict the further development and enhancement of the Qi standard. For example, it may provide a hindrance to the introduction of the new (higher) power levels or new communication methods (such as for example new bidirectional communication techniques).

Further enhancing the standardized operation to support such increased flexibility is very difficult as it must not only provide an efficient operation resulting in reliable and effective operation but must also be backwards compatible. Specifically, the enhanced standards must still allow for equipment operating in accordance with the current standards (version 1.0 and 1.1 of the Qi Standard) to be supported.

This may provide a number of difficulties. For example, simply expanding the current configuration phase may not be suitable as it requires modified operations of existing equipment. Furthermore, it may not allow sufficient flexibility in determining further operating parameters. Another problem is that additional configuration requires time to be performed and such time may not be available in accordance with the current standards.

For example, extending the configuration packet transmitted from the power receiver to include newly defined bits indicating requests for specific values of specific operating parameters may in principle be possible as the current Qi Standards include an unused time interval between the configuration packet and the subsequent packet. However, a first extension of the Qi Standard could allow only for a single acknowledgement to be provided by the power transmitter. Accordingly, a single acknowledgement for multiple requests results in the response of the power transmitter becoming ambiguous. E.g. If the power receiver sends a packet comprising a requests a power level of 30 W and a request for a dedicated communication mode, the power transmitter could only positively acknowledge such request if it supports both the power level of 30 W and the dedicated communication mode. If the power transmitter supports only one of the two requests, it will have to reject the request.

It is furthermore highly desirable that the arrangement maintains low complexity and easy operation. In particular, it is desirable that communication from the power transmitter has low complexity, and indeed it is desirable in many situations that the communication from the power transmitter is restricted to single bit acknowledgements. This allows for a significantly facilitated implementation of the power transmitter to power receiver communication. For example, it may result in a very low data rate requirement e.g. allowing detection to be based on very slow power signal variations.

Thus, introducing a power transmitter to power receiver communication e.g. providing data defining the exact capability of the power transmitter to support specific operating parameters requires a more complex communication protocol from power transmitter to power receiver and may therefore not be practical for systems such as Qi systems. In addition if the communication channel from power transmitter only supports a low data rate, the communication of such increased information could take considerable time. Such a more complex and time demanding solution would not fit very well in extending a low cost low power solution such as Qi. Rather, a solution that corresponds to a simpler extension of e.g. the existing Qi specification v1.1 to e.g. enable 10-15 W applications would be preferable.

Hence, an improved power transfer system would be advantageous and in particular a system allowing increased flexibility, improved backwards compatibility, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided method of operation for an inductive power transfer system comprising a power transmitter generating a wireless power signal for a power receiver, the inductive power transfer system supporting two-way communication between the power transmitter and the power receiver based on modulation of the power signal, the method comprising: the power receiver initiating a mandatory configuration phase by transmitting a signal strength package to the power transmitter; the power transmitter and the power receiver operating the mandatory configuration phase wherein a first set of power transfer operating parameters are selected for the power transmitter and the power receiver; the power receiver transmitting a request to enter a requested negotiation phase; the power transmitter acknowledging the request to enter the requested negotiation phase by transmitting an acknowledgement to the power receiver; the power transmitter entering the requested negotiation phase in response to receiving the request to enter the requested negotiation phase; the power receiver entering the requested negotiation phase in response to receiving the acknowledgment from the power transmitter; the power receiver and power transmitter determining a second set of operating parameters by performing the requested negotiation phase.

The invention may provide an improved power transfer system. It may in many embodiments allow for further extension and development of a power transfer system while maintaining backwards compatibility. The invention may allow a practical approach and may facilitate introduction into existing systems.

Specifically, for a Qi system, the existing configuration approach based on an identification and configuration phase may be maintained unchanged while still allowing new features and operational ranges to be supported. The approach may for example allow an extension to higher power levels or more advanced communication protocols while still providing backwards compatibility with devices of the Qi Specification version 1.0 or 1.1.

Furthermore, the approach may fit well with the design principles and philosophies of many existing power transfer systems. For example, the approach follows the design principles and philosophies of the Qi power transfer system. E.g., it may allow the power receiver to remain to be the main controller. Thus, the introduction into such systems may be facilitated.

The approach may use one directional communication (from the power receiver to the power transmitter) in the mandatory configuration phase and bidirectional (two-way) communication in the requested negotiation phase. The approach may further allow this bidirectional communication to be asymmetric and specifically may allow a substantially lower data rate from the power transmitter to the power receiver than from the power receiver to the power transmitter. A lower complexity power transmitter may be achieved. This may in particular facilitate introduction into existing systems, such as the Qi system, which are based on communication only from power receiver to the power transmitter.

The requested negotiation phase may be an optional phase. Specifically, it need not be supported by all devices as power transfer operation may in many embodiments be possible using only the mandatory configuration phase. In some embodiments, it may also be optional between negotiation phase capable devices, and may possibly only be entered if desired by the power receiver. Although the negotiation phase will be optional, it may be mandatory that new devices support it. For example, mandatory support by all power transmitters that are compliant with Qi specification versions that include the negotiation phase may be required in order to enable power receivers to enter this phase if requested.

The negotiation phase may also be configuration phase in the sense that it allows for operating parameters to be selected/determined (it will be appreciated that such selection/determination includes both selecting/determining parameter values for parameters and/or selecting/determining whether the operating parameters are used (e.g. wither a specific function is applied or not)). However, whereas, in some embodiments, the configuration phase may be based on the power receiver commanding which operating parameters (and values) must be used with the power transmitter being obliged to follow them, the negotiation phase involves a negotiation between the two devices. Thus, the power transmitter is not obliged to follow the requests of the power receiver but may decline these (or e.g. suggest other values).

The negotiation phase will typically be after the configuration phase and can be used to determine new operating parameters that cannot be determined in the configuration phase. In some scenarios, it may modify parameters already set in the mandatory configuration phase. Thus, the second set of parameters may include one or more of the parameters of the first set. The second set may be disjunctive from the first set. In some embodiments and scenarios, the second set of operating parameters may overlap the first set of power transfer operating parameters. The operating parameters set during the negotiation phase may thus include parameters that have previously been set in the configuration phase. Alternatively or additionally the operating parameters set during the negotiation phase may include parameters that have not previously been set in the configuration phase (and which potentially cannot be set during the configuration phase).

The request to enter a requested negotiation phase may be transmitted in a dedicated message or may e.g. be transmitted as part of a message that also includes other information. For example, the request to enter the negotiation phase may be transmitted by setting a bit in a multibit message with other bits being used for different functionality.

The acknowledgement by the power transmitter may be a simple one bit acknowledgement, and/or may be part of a message comprising other information. In some embodiments, redundancy may be introduced to the acknowledgement, e.g. using error correcting coding (such as a simple repetition code).

In accordance with an optional feature of the invention, the power receiver transmits the request to enter the requested negotiation phase during a power transfer phase.

This may provide a flexible and dynamic approach for optimizing operation of a power transfer system. It may provide a particularly efficient approach for changing the operation of the system during active use.

In accordance with an optional feature of the invention, the power receiver transmits the request to enter the requested negotiation phase prior to entering a power transfer phase.

This may provide an efficient approach for setting up the power transfer phase using enhanced functionality compared to what can be determined in the configuration phase. It may provide for a particularly efficient and backwards compatible approach to initializing the power transfer.

In accordance with an optional feature of the invention, the configuration phase includes the power receiver determining whether the power transmitter supports a negotiation phase, and the power receiver selects whether to transmit the request to enter the requested negotiation phase dependent on the determination of whether the power transmitter supports the negotiation phase.

This may provide a more robust and reliable operation. In many embodiments, it may prevent erroneous operation caused by use of a message that may be unknown to devices not supporting the negotiation phase, and may e.g. provide improved backwards compatibility.

In accordance with an optional feature of the invention, the second set of operating parameters comprises a communication parameter for the communication between the power transmitter and the power receiver.

The invention may provide a particularly efficient and backwards compatible approach for enhancing existing or introducing new communication capabilities thereby allowing improved performance and/or increased functionality.

In accordance with an optional feature of the invention, the second set of operating parameters comprises a power level parameter for a power transfer from the power transmitter to the power receiver.

The invention may provide a particularly efficient and backwards compatible approach for enhancing the power transfer capabilities of a power transfer system thereby allowing improved performance and/or increased functionality. For example, it may provide a particularly efficient approach for introducing support of new (higher) power levels.

The power level requirement for a power transmitter as described in v1.0 and v1.1 of Qi is defined by the ability of the power transmitter to guarantee a certain rectified power on a test power receiver. Such guaranteed power level in Qi v1.0 and v1.1 is for example 5W for an appropriate reference power receiver. Some embodiments of the invention allow to negotiate the guaranteed power to a higher level, e.g. 15 W rectified power to an appropriate reference power receiver in the negotiation phase. In response to a request from power receiver to power transmitter for a guaranteed power level, of e.g. 15 W, the power transmitter indicates if it supports such level or not.

A maximum power level indication for the power receiver as described in v1.0 and v1.1 of Qi is defined by a maximum rectified power level of the power receiver. This value may also be used as reference value for the definition of the received power. The received power is defined as a relative value towards the maximum rectified power level of the power receiver. Existing power transmitters may not support a maximum power level of a power receiver larger than e.g. 5 W, or even may shutdown in case the power receiver indicates a higher value than e.g. 5 W level in the configuration phase. Especially setting the power class bits of in the configuration packet as described in 6.3.7 of Qi v1.0 and v1.1 leads to problems with some existing power transmitters. Embodiments of our invention allow to negotiate the maximum power to a higher level, e.g. 15 W in the negotiation phase.

The accuracy for the received power is subject for improvement for power levels higher than 5 W. Part of the accuracy can be improved by using a received power packet with a larger payload. An increase of the payload from 8 bit to 16 bit will allow to code the received power more accurately. The received power packet as defined in v1.0 and v1.1 of Qi has a payload of 8 bit. To define a 16 bit received power packet requires to make use of a currently reserved packet in Qi v1.0 and v1.1. Such an information packet may e.g. be sent during the negotiation phase. Existing power transmitters will not support such 16 bit received power packet, but more severe some power transmitters will even shutdown if such currently reserved packet is used by the power receiver.

The embodiments allow to negotiate the use of a 16-bit received power packet, or more in general to negotiate which received power packet to use.

In accordance with an optional feature of the invention, when in the negotiation phase, the power receiver and power transmitter determine the second set of parameters in a number of negotiation cycles, each negotiation cycle comprising the power receiver transmitting a message specifying an operating parameter and the power transmitter responding with a message accepting or rejecting the operating parameter.

The use of negotiation cycles may provide a particularly suitable approach for the negotiation phase. In particular, it may provide a low complexity approach for negotiating individual parameters separately. The approach may allow the negotiation phase to be based on asymmetric communication and in particular the effective data rate from the power receiver to the power transmitter may be much larger than the rate from the power transmitter to the power receiver. Indeed, in many embodiments, each negotiation cycle may require only the communication of a single bit (indicating acceptance or rejection) from the power transmitter. The demodulation and interpretation of a single bit communication from the power transmitter to the power receiver allows the necessary communication time to be very short, the data rate to be low and/or allows reduced complexity and/or more cost-efficient implementations of the power receiver. This is in contrast to a solution where the power transmitter communicates its capabilities using complete data-packets, which will result in longer communication time, higher data rate and more complex and cost-increasing implementations of the power receiver.

The approach may be particularly suitable for systems such as the Qi system which is originally developed based only on unidirectional communication from the power receiver to the power transmitter 101, and with limited scope for introducing communication in the reverse direction. It may substantially facilitate introduction of the bidirectional communication required to support the negotiation phase.

The message accepting or rejecting the operating parameter by the power transmitter may be a simple one bit message or may be a multiple bit message e.g. including further information. For example, the message may indicate that the parameter is accepted, rejected, or not understood (which is also treated as a rejection). In some embodiments, the first message may further include an acknowledgement of the receipt of the message specifying the operating parameter. The message accepting or rejecting the operating parameter may further include redundant bits provided to increase the reliability of the communication. For example, redundant bits being part of an error code may be used (e.g. a simple repetition code may be used).

In accordance with an optional feature of the invention, when in the negotiation phase, the power transmitter proceeds to a power transfer phase in response to receiving a power control error message from the power receiver.

This may provide improved and/or more reliable operation of the power transfer system.

In accordance with an optional feature of the invention, when in the negotiation phase, the power receiver transmits a negotiation phase termination message, and the power transmitter terminates the negotiation phase and enters a power transfer phase in response to receiving the negotiation phase termination message.

This may provide improved and/or more reliable operation of the power transfer system.

In accordance with an optional feature of the invention, when in the negotiation phase, the power receiver transmits a power-end message in response to a determination that the second set of parameters does not meet the power receivers requirements, and the power transmitter is arranged to terminate the negotiation phase and return to a stand-by phase in response to receiving the power-end message.

This may provide improved and/or more reliable operation of the power transfer system.

In accordance with an optional feature of the invention, when in the negotiation phase, the power receiver transmits a power control error message and enters a power transfer phase after discarding parameter changes introduced by the negotiation phase, and the power transmitter terminates the negotiation phase and enters the power transfer face after discarding parameter changes introduced by the negotiation phase in response to receiving the power control error message.

This may provide improved and/or more reliable operation of the power transfer system.

In accordance with an optional feature of the invention, the request to enter the requested negotiation phase is comprised in a message of the configuration phase.

This may provide a particularly advantageous approach and may result in a low complexity yet reliable and efficient initialization of the power transfer.

In accordance with an optional feature of the invention, the mandatory configuration phase is performed in accordance with the specifications of the Qi power transfer standard version 1.0 or 1.1.

The system may allow enhanced and/or new functionality to be introduced to a Qi power transfer system while still allowing existing devices that are only version 1.0 or 1.1 compatible to be used.

According to an aspect of the invention there is provided a method of operation for a power transmitter of an inductive power transfer system comprising the power transmitter generating a wireless power signal for a power receiver, the inductive power transfer system supporting two-way communication between the power transmitter and the power receiver based on modulation of the power signal, the method comprising: receiving a signal strength package from the power receiver initiating a mandatory configuration phase; operating the mandatory configuration phase wherein a first set of power transfer operating parameters are selected for the power transmitter and the power receiver; receiving a request to enter the requested negotiation phase from the power receiver; acknowledging the request to enter an requested negotiation phase by transmitting an acknowledgement to the power receiver; entering the requested negotiation phase in response to receiving the request to enter the requested negotiation phase; and operating the requested negotiation phase wherein a second set of power transfer operating parameters are selected for the power transmitter and the power receiver.

According to an aspect of the invention there is provided a method of operation for a power receiver of an inductive power transmission system comprising a power transmitter generating a wireless power signal for the power receiver, the power transmission system supporting two-way communication between the power transmitter and the power receiver, the two-way communication being based on modulation of the power signal, the method comprising: initiating a mandatory configuration phase by transmitting a signal strength package to the power transmitter; operating the mandatory configuration phase wherein a first set of power transfer operating parameters are selected for the power transmitter and the power receiver; transmitting a request to enter the requested negotiation phase; entering the requested negotiation phase in response to receiving an acknowledgment message from the power transmitter; operating the requested negotiation phase wherein a second set of power transfer operating parameters are selected for the power transmitter and the power receiver.

According to an aspect of the invention there is provided an inductive power transfer system comprising a power transmitter and a power receiver, the power transmitter being arranged to generate a wireless power signal for the power receiver and the inductive power transfer system being arranged to support two-way communication between the power transmitter and the power receiver based on modulation of the power signal, and wherein the power receiver is arranged to initiate a mandatory configuration phase by transmitting a signal strength package to the power transmitter; the power transmitter and the power receiver are arranged to operate the mandatory configuration phase wherein a first set of power transfer operating parameters are selected for the power transmitter and the power receiver; the power receiver is arranged to transmit a request to enter a requested negotiation phase; the power transmitter is arranged to acknowledge the request to enter the requested negotiation phase by transmitting an acknowledgement to the power receiver; the power transmitter is arranged to enter the requested negotiation phase in response to receiving the request to enter the requested negotiation phase; the power receiver is arranged to enter the requested negotiation phase in response to receiving the acknowledgment from the power transmitter; and the power receiver and power transmitter are arranged to determine a second set of operating parameters by performing the requested negotiation phase.

According to an aspect of the invention there is provided an power transmitter for an inductive power transfer system, the inductive power transfer system supporting two-way communication between the power transmitter and a power receiver based on modulation of a power signal, the power transmitter comprising: means for generating the power signal; means for receiving a signal strength package from the power receiver initiating a mandatory configuration phase; means for operating the mandatory configuration phase wherein a first set of power transfer operating parameters are selected for the power transmitter and the power receiver; means for receiving a request to enter the requested negotiation phase from the power receiver; means for acknowledging the request to enter an requested negotiation phase by transmitting an acknowledgement to the power receiver; means for entering the requested negotiation phase in response to receiving the request to enter the requested negotiation phase; and means for operating the requested negotiation phase wherein a second set of power transfer operating parameters are selected for the power transmitter and the power receiver.

According to an aspect of the invention there is provided a power receiver of an inductive power transmission system comprising a power transmitter generating a wireless power signal for the power receiver, the power transmission system supporting two-way communication between the power transmitter and the power receiver based on modulation of the power signal, the method comprising: means for initiating a mandatory configuration phase by transmitting a signal strength package to the power transmitter; means for operating the mandatory configuration phase wherein a first set of power transfer operating parameters are selected for the power transmitter and the power receiver; means for transmitting a request to enter the requested negotiation phase; means for entering the requested negotiation phase in response to receiving an acknowledgment message from the power transmitter; means for operating the requested negotiation phase wherein a second set of power transfer operating parameters are selected for the power transmitter and the power receiver.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
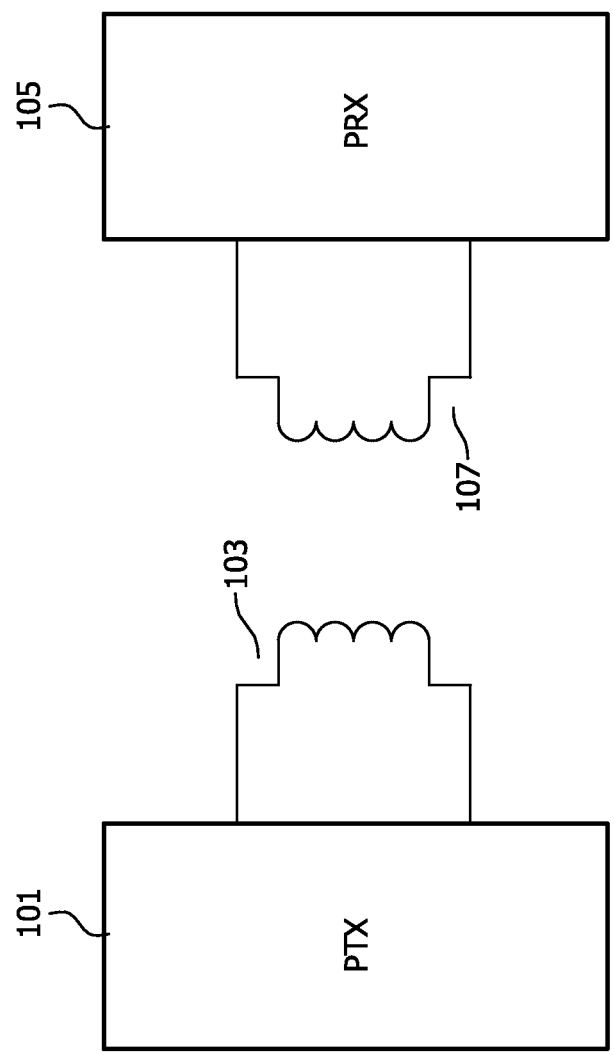
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a power signal which is propagated as a magnetic flux by the transmitter coil 103. The power signal may typically have a frequency between around 100 kHz to 200 kHz. The transmitter coil 103 and the receiver coil 105 are loosely coupled and thus the receiver coil picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the electrical signal provided to the transmitter coil 103 but it will be appreciated that by equivalence it may also be considered and used as a reference to the magnetic flux signal, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 103 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On physical level, the communication channel from the power receiver 105 to the power transmitter 101 is implemented by using the power signal as carrier. The power receiver 105 modulates the load of the receiver coil 105. This results in corresponding variations in the power signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the identification & configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

The system then moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

It is noted that the Qi wireless power specification versions 1.0 and 1.1 define only communication from the power receiver 105 to the power transmitter 101, i.e. it defines only a unidirectional communication.

However, in the system of FIG. 1 bidirectional communication is used, i.e. communication of data is also possible from the power transmitter 101 to the power receiver 105. Various applications may benefit from such communication, for example: setting a power receiver in test mode, setting a power receiver in calibration mode, or allowing communication from power transmitter to power receiver under the control of the power receiver, e.g. for communicating a command, or status information from power transmitter to power receiver.

Figure 2:
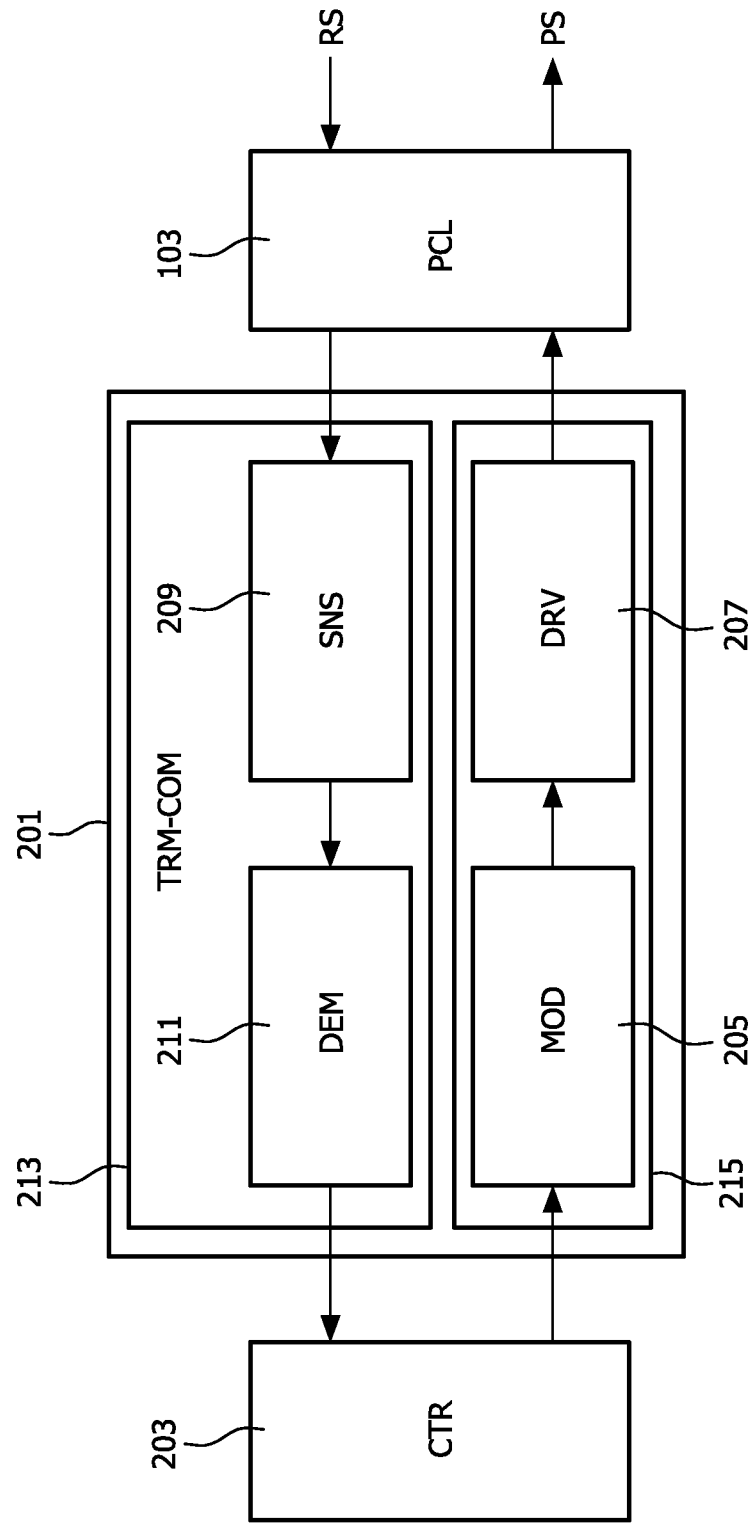
FIG. 2 illustrates an example of elements of a power transmitter in accordance with some embodiments of the invention.

FIG. 2 illustrates the power transmitter 101 of FIG. 1 in more detail. The transmitter coil 103, also called the primary coil 103 (PCL), is shown connected to a power transmitter communication unit 201 (TRM-COM), which is coupled to a transmitter controller 203 (CTR).

The power transmitter communication unit 201 has a modulator 205 (MOD), coupled to a driver 207 (DRV) for driving the transmitter coil 103 for transmitting a (potentially) modulated power signal (PS) via the transmitter coil 103 to the receiver coil 105.

In the system, the power receiver 105 may load modulate the power signal to send a power receiver signal to the power transmitter 101 via the receiver coil 107 and the transmitter coil 103. This signal is called a reflected signal (RS). The reflected signal is detected by a sense unit 209 (SNS), e.g. by sensing the current or voltage on the transmitter coil 103. A demodulator 211 (DEM) is coupled to the transmitter controller 203 for demodulating the detected signal, e.g. by converting changes in the amplitude or phase of the detected signal into bits.

In the example of FIG. 2, a first unit 213 is arranged to receive data from the power receiver 105 via the transmitter coil 103. The first unit 213 comprises the sense unit 209 and the demodulator 211. These two units implement the function of receiving the data via the transmitter coil 103. The transmitter coil 103 transmits an alternating magnetic field (the power signal PS) for inductive power transfer to the receiver coil 107 and receives the reflected magnetic field (reflected signal RS) caused by the receiver coil 107 (i.e. the variations in the power signal caused by the load modulation). The sense unit 209 (current/voltage sensor SNS) senses the current/voltage on the transmitter coil 103. The demodulator 211 translates changes of amplitude or phase of the sensed signal into data.

The transmitter controller 203 interprets the received data and may in response control a second unit 205 to transmit a message to the power receiver 105 via the transmitter coil 103. The message may in the example specifically be a response message intended for responding to messages from the power receiver 105, and may specifically be an acknowledge/non-acknowledge or accept/reject message. Such a communication arrangement may allow a low complexity approach and may avoid the need for complex communication functionality and protocols for supporting the power transmitter to power receiver communication. The approach may further allow the power receiver to remain the controlling element for the power transfer, and thus fits well with the general design principles of the Qi power transfer approach.

Specifically, the transmitter controller 203 controls the modulator 205 which modulates the power signal to provide the desired message. The modulator 205 may specifically modulate the power signal by changing the amplitude, frequency, or phase of the power signal, i.e. it may typically use AM, FM and/or PM modulation. The driver 207, also comprised by the second unit 215, is arranged to transmit the modulated power signal via the transmitter coil 103 to the power receiver 105 by supplying an alternating electric signal to the transmitter coil 103.

The controller 203 is further arranged to control the power transfer settings and to implement the required control and operational phases and functionality. In particular, the controller 203 may receive and interpret the messages from the power receiver 103, and may in response e.g. set the required power level for the power signal. Specifically, during the identification and configuration phase, the controller 203 may interpret the configuration packet or message from the power receiver 105 and may e.g. set the maximum power signal level accordingly. During the power transfer phase, the transmitter controller 203 may increase or decrease the power level in accordance with the control error messages received from the power receiver 105.

Figure 3:
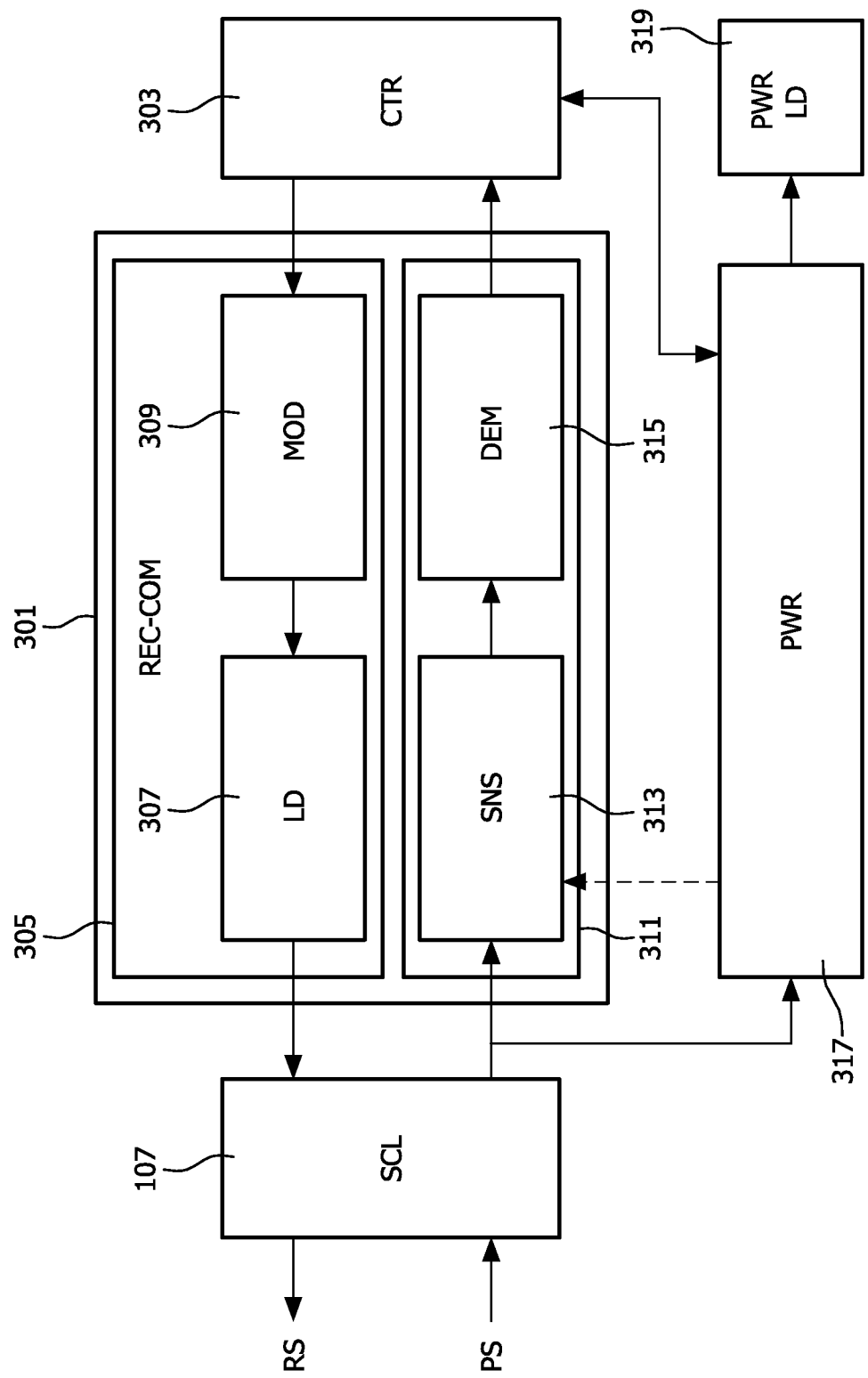
FIG. 3 illustrates an example of elements of a power receiver in accordance with some embodiments of the invention.

FIG. 3 illustrates the power receiver 105 of FIG. 1 in more detail. The receiver coil 107 (SCL) is shown connected to a power receiver communication unit 301 (REC-COM), which is coupled to a receiver controller 303 (CTR). The power receiver 105 comprises a first unit 305 for sending data to the power transmitter 101 via the receiver coil 107 to the transmitter coil 103. The first unit 305 has a changeable load (LD) 307 coupled to a modulator 309 (MOD) for modulating the load at the receiver coil 107 for generating the reflected signal (RS) for transmitting data to the power transmitter 101. It will be understood that the first unit 305 is a functional unit that comprises the modulator 309 and the changeable load 307.

The power receiver 105 further comprises a second unit 311 for receiving a message from the power transmitter 101 via the receiver coil 107. For this purpose, the second unit 311 comprises a sense unit 313 (SNS) for detecting a modulated power signal (PS) received via the receiver coil 107 from the power transmitter 101, e.g. by sensing a voltage or current.

The second unit 311 further comprises a demodulator 315 (DEM), which is coupled to the sense unit 313 and the receiver controller 303. The demodulator 315 demodulates the detected signal according to the used modulation. The modulation may for example be an Amplitude Modulation (AM), Phase Modulation (PM) or Frequency Modulation (FM), and the demodulator 315 may perform the appropriate demodulation to obtain the message, e.g. by converting changes in the amplitude, frequency and/or phase of the detected signal into bits.

As an example, the receiver coil 107 may receive the power signal for inductive power transfer from the transmitter coil 103 and may send a reflected signal to the transmitter coil 103 by varying the load 307. Thus, the variations of the load 307 provide the modulation of the power signal. The modulator 309 controls the amplitude (and/or frequency and/or phase of the reflected signal), i.e. it controls the operation of the load 307, e.g. by connecting/disconnecting an impedance circuit. The current/voltage sense unit 313 senses the current/voltage on the receiver coil 107 as received from the power transmitter 101. The sense unit 313 may be part of another function of the power receiver and specifically may be part of the rectification and smoothing of the power signal used to generate a DC power. The demodulator 315 translates changes of the sensed signal into data. The receiver controller 303 (amongst other things) controls the modulator 309 to communicate data and interprets the data received by the demodulator 315.

The power receiver coil 107 is further connected to a power unit 317 which is arranged to receive the power signal and to extract the power during the power transfer phase. The power unit 317 is coupled to a power load 319 which is the load powered from the power transmitter 101 during the power transfer phase. The power load 319 may be an external power load but is typically part of the power receiver device, such as a battery, display or other functionality of the power receiver (e.g. for a smart phone the power load may correspond to the combined functionality of the smart phone).

The power receiver coil 107 may specifically include a rectifier circuit, a smoothing circuit (a capacitor) and a voltage (and/or current) regulation circuit in order to provide a stabilized DC output voltage (or current) supply.

The power unit 317 is coupled to the receiver controller 303. This allows the receiver controller 303 to determine the operational characteristics of the power circuit and e.g. may be used to provide information on the current operating point to the receiver controller 303. The receiver controller 303 may use this to generate the control error messages during the power transfer phase. The receiver controller 303 may further control the operation of the power unit 317, e.g. the receiver controller 303 may switch the load in and out. Specifically, the receiver controller 303 may control the power unit 317 to disconnect the load during the configuration phase and connect it during the power transfer phase.

In the system of FIG. 3, the sense unit 313 is shown to directly receive the power signal and the second unit 311 demodulates the data directly from the power signal. This may for example be useful for frequency modulation.

However, in many scenarios the sense unit 313 may not directly sense the power signal but rather a signal of the power unit 317.

As a specific example, the sense unit 313 may measure the rectified and smoothed voltage generated by the power unit 317. This may be particularly suitable for AM modulation of the power signal.

Figure 4:
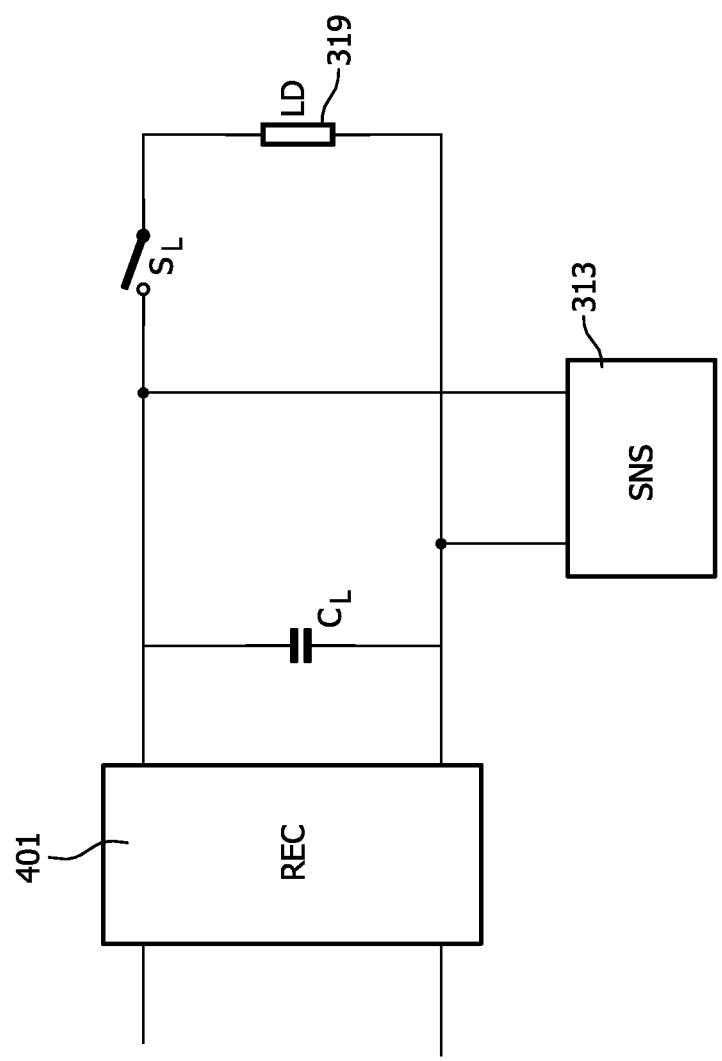
FIG. 4 illustrates an example of elements of a power receiver in accordance with some embodiments of the invention.

Specifically, FIG. 4 illustrates elements of the power unit 317 in more detail. The signal from the receiver coil 107 is rectified by a rectifier 401 (typically a bridge rectifier) and the resulting signal is smoothed by the capacitor $C_L$ resulting in a smoothed DC voltage (with a ripple depending on the power consumption and value of CL). FIG. 4 furthermore shows a switch $S_L$ for switching the power load 319 in and out. In order to ensure a sufficiently low ripple during power transfer the capacitor $C_L$ is typically selected to be relatively high thereby leading to a slow time constant for capacitor and load combination.

In the example, the power transmitter 101 may apply amplitude modulation to the power signal in order to communicate from the power transmitter 101 to the power receiver 105. This will result in amplitude changes across the capacitor $C_L$, and in the example the sense unit 313 is coupled to measure this voltage. Thus, the voltage variations across the capacitor $C_L$ may be detected and used to recover the data modulated onto the power signal.

Using such an approach may reduce cost and complexity as it allows components to be reused. However, in order to have a low ripple the capacitor $C_L$ must be relatively large which results in slow voltage variations across the capacitor $C_L$. This will be even more pronounced when the load is not connected, i.e. during the identification and configuration phase. This may restrict the data rate very substantially. Accordingly, the system of FIG. 1 applies a communication and operational protocol which is suitable for low data rate communication from the power transmitter 101 to the power receiver 105. Indeed, in many scenarios, it is advantageous if the messages from the power transmitter 101 to the power receiver 105 can be restricted to single bit messages.

The current standardization of the Qi standard is based on a unidirectional communication from power receiver to power transmitter. The operating principle is thus based on the power receiver controlling the operation as well as the adjustment and selection of operating parameters. Furthermore, the adaptation and customization of parameters is limited to a few specific operating parameters that are set during the identification and configuration phase. However, as the system is developed, this approach has been found to be very restrictive and to limit the functionality, user experience and performance that can be provided by the power transfer system. It is therefore desirable to enhance power transfer systems, such as specifically the Qi system of versions 1.0 and 1.1 of the specifications, to provide a more flexible approach for selecting and adapting operating parameters. For example, support for more power levels, including higher power levels, than supported by current standards would be desirable. As another example, the ability to select, support and optimize more complex communication protocols would be advantageous.

However, the introduction of such enhanced functionality is challenging and is subject to many difficulties and challenges. Indeed, it is required that the additional functionality allows for backwards compatibility and specifically that existing version 1.0 and 1.1 devices can be used with devices supporting the enhanced functionality. Also, the enhancements should preferably have low complexity and facilitate combination and interworking with the existing standards. Therefore, it is desirable to reduce the changes and modifications required. The further enhancements should accordingly preferably follow the design strategy and principles of the existing standard.

In the system of FIG. 1, support for enhanced functionality is provided by introducing an additional negotiation phase that allows the power transmitter 101 and power receiver 105 to negotiate further operating parameters.

Indeed, configuration of operating parameters is hardly allowed in v1.0 and v1.1 of the Qi standard. The configuration of the operating parameters is based on a unidirectional communication and in particular on the power receiver defining and communicating specific parameter values to the power transmitter which must then apply these.

The information that can be communicated during the identification and configuration phase of versions 1.0 and 1.1 of the Qi system consists in the following:
Identification Parameters
 Version of the power receiver
 Manufacturer code
 Identifier
Configuration Parameters
 Power Control Hold-off Time
 Maximum power (defined with 2 bits indicating power class and a 6 bit max power field)
 Prop—indication that proprietary control may be used
More details on these parameters can be found in the Qi Specification version 1.0 and 1.1.

Figure 5:
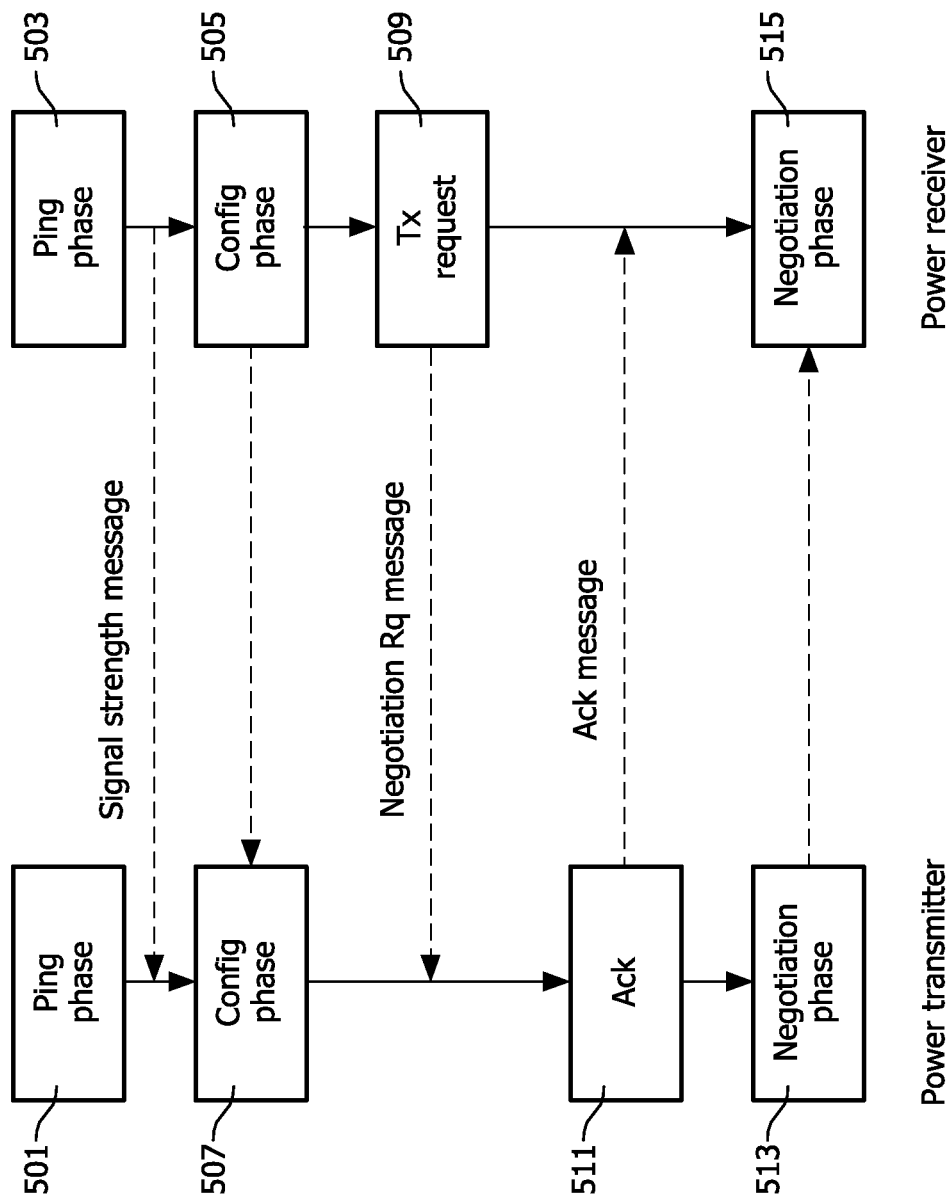
FIG. 5 illustrates an example of elements of a method of operation for a power transfer system in accordance with some embodiments of the invention.

In the system of FIG. 1, the configuration phase is maintained. Thus, a mandatory configuration phase is performed which allows for a limited set of operating parameters to be defined. For a Qi power transfer system, this configuration phase specifically corresponds to the identification and configuration phase However, in addition, a new negotiation phase is introduced in which the system can determine further operating parameters (and/or modify operating parameters already determined in the configuration phase—typically with the negotiation phase allowing a wider range of values to be selected). The negotiation phase is based on the power transmitter 101 and power receiver 105 negotiating parameters using a bidirectional communication. Thus, in contrast to the configuration phase, the power transmitter does not necessarily have to apply the operating parameters defined by the power receiver but may accept or reject these values. However, in the system of FIG. 1, the negotiation phase still supports the underlying design principle of the Qi system by allowing the power receiver 105 to be the main controlling element. Specifically, in most embodiments, the negotiation phase may support a system wherein the operating parameters are suggested by the power receiver 105 with the power transmitter 101 merely acknowledging/non-acknowledging (accepting/rejecting) the proposed parameters. This furthermore facilitates the communication from the power transmitter 101 to the power receiver 105 and in particular allows for a low data rate communication channel to be sufficient to support the operation. This may further allow reduced complexity and cost, e.g. by allowing amplitude detection using existing rectification and smoothing capacitor circuits, or using simple frequency demodulation techniques e.g. by measuring the time of a fix amount of zero crossings of the received signal FIG. 5 illustrates an example of the operation of the power transfer system of FIG. 1.

Initially, both the power receiver 105 and power transmitter 101 operate in the ping phase 501, 503 where the power transmitter 101 temporarily powers up. In response, the power receiver 105 transmits a signal strength message to the power transmitter 101 and moves into the (identification &) configuration phase 505. Furthermore, when receiving the signal strength message, the power transmitter 101 moves from the ping phase to the (identification &) configuration phase.

The power transmitter 101 and power receiver 105 then proceed to perform the (identification &) configuration phase to establish a first set of power transfer parameters. Specifically, the power receiver may provide an identification of itself (such as by a version number) and a power transfer value may be defined.

The communication is unidirectional and specifically is achieved by the power transmitter 101 maintaining a constant power signal and the power receiver 105 providing a load modulation of this signal. At the end of the configuration phase, a basic power contract has been established between the power receiver 105 and the power transmitter 101. This power contract specifically corresponds to a power level that will be consumed by the power receiver 105 and which must be provided by the power transmitter 101.

The previous steps may specifically be performed in accordance with the Qi standards version 10 or 1.1. Thus, the system of FIG. 1 can fully support existing version 1.0 and 1.1 devices thereby maintaining backwards compatibility.

However, in the present case the power receiver 105 and power transmitter 101 are enhanced devices capable of supporting a negotiation phase for configuring further operating parameters (or for modifying existing operating parameters).

Accordingly, at some stage the power receiver 105 may transmit a message to the power transmitter 101 requesting that the system enters the negotiation phase. Such request message could be a dedicated message for this purpose, but could also be part of a message including other information for the power transmitter. The request may e.g. be included in the last message of the identification & configuration phase. When receiving the negotiation phase request message, the power transmitter 101 proceeds to transmit 511*a* positive acknowledgement message after which it enters the negotiation phase 513. Furthermore, in response to receiving the positive acknowledgement message, the power receiver 105 proceeds to enter the negotiation phase 515.

The power receiver 105 and power transmitter 101 then proceed to determine further operating parameters by following a negotiation protocol as will be described in more detail later. The further operating parameters may include new parameters that cannot be defined in the configuration phase in accordance with versions 1.0 and 1.1 of the Qi Specifications. For example, the negotiation phase may be used to define suitable communication parameters or protocols for the bidirectional communication. Alternatively or additionally, the negotiation phase may modify parameters that may already have been defined in the identification and configuration phase. In many embodiments, such modifications may however also include changing the parameters to values that are not allowed or supported by versions 1.0 or 1.1 of the Qi Specification.

For example, version 1.0 and 1.1 are aimed at low(er) powered devices having a power consumption of no more than 5 W. The power transmitter 101 must be able to support the power level indicated by the power receiver 105 in the identification and configuration phase, and therefore the power receiver 105 is restricted to request a power of up to 5 W. However, work is ongoing on developing the standard to also support medium powered devices with a power consumption up to 120 W. Such higher power can in the system of FIG. 1 be supported by the identification and configuration phase being used to set up a power contract for 5 W followed by the power receiver 105 requesting the initialization of the negotiation phase in which it can negotiate a change of the power transfer contract to e.g. 15 W. Thus, the described approach can allow the introduction of higher powered devices while providing full backwards compatibility. Indeed, as the identification and configuration phase is compatible with versions 1.0 and 1.1 of the Qi specification, the power transmitter 101 of FIG. 1 is capable of interworking with any version 1.0 or 1.1 power receiver. Similarly, the power receiver 105 of FIG. 1 is capable of interworking with any version 1.0 or 1.1 power transmitter (although it will of course be restricted to the operation (e.g. power level) defined by that version).

Furthermore, the negotiation phase is entered on request of the power receiver 105. Thus, the main control and complexity of the operation is maintained by the power receiver. This approach further follows the design philosophy of the Qi system and minimizes the changes that are required to the devices (including the power receiver as the operation thereof does not need to change radically to support transmitter controlled operations).

Thus, the negotiation phase is an optional phase. Indeed, the system can operate based only on the identification and configuration phase and without ever entering the negotiation phase. However, on request, the negotiation phase can be entered to provide further flexibility and customization of operating parameters. The negotiation phase is furthermore optional in the sense that it is not an essential function that must be supported by all Qi devices. Rather, it may only be supported by enhanced devices whereas simpler, e.g. legacy, devices can still support only versions 1.0 and 1.1. However if a device promises the new advance features to be negotiated in the negotiation phase, it will generally have to comply to the negotiation procedure as described for the negotiation phase.

The approach thus provides a practical, efficient, low complexity approach for enhancing a power transfer system while maintaining a high degree of backwards compatibility. The approach may allow additional functionality, improved performance and/or an enhanced user experience. For example, it may allow the introduction of new power levels and new communication methods in further releases of the Qi standard.

In the example of FIG. 1 the negotiation phase is specifically performed by a number of negotiation cycles where each negotiation cycle determines at least one operating parameter by the power receiver 105 suggesting or requesting a value for the operating parameter and the transmitter responding by accepting or rejecting the request. Specifically, in the example, each negotiation cycle includes the power receiver 105 requesting a value for one operating parameter and the transmitter responding by a one bit message accepting or rejecting the requested value. The negotiation phase may include a single negotiation cycle or may comprise a plurality of negotiation cycles in order to set a plurality of parameter values.

Indeed, in some embodiments, the number of negotiation cycles may vary depending on the outcome of previous negotiation cycles. For example, if the power receiver 105 requests a specific power value which is rejected by the power transmitter 101, the power receiver 105 may proceed to request a lower value in a subsequent negotiation cycle.

In the system, one or typically more, negotiation cycles are thus performed in the negotiation phase. The negotiation cycles may each apply to an individual operating parameter that is individually accepted or rejected by the power transmitter 101, thereby providing a low complexity approach ensuring that the power transmitter 101 and power receiver 105 achieve unambiguous commitment to the new parameters. Specifically, in each negotiation cycle, the power receiver 105 requests for the support of a certain operating parameter to which the power transmitter 101 replies with a response message to indicate if it accepts or declines the request. Each of the operating parameters can relate to a power level, communication modes, foreign object detection, etc.

Figure 6:
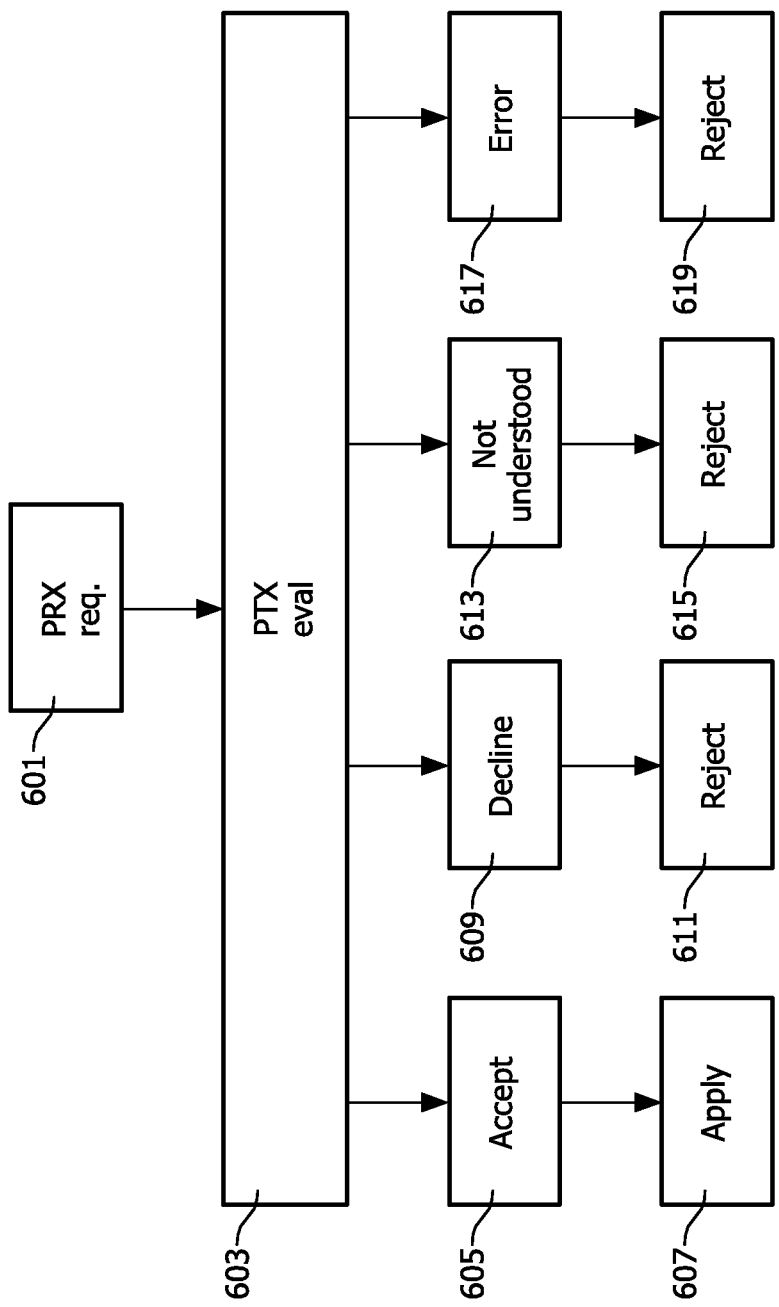
FIG. 6 illustrates an example of elements of a method of operation for a power transfer system in accordance with some embodiments of the invention.

An example of an exemplary negotiation cycle is described with reference to FIG. 6.

The negotiation cycle begins in step 601 wherein the power receiver 105 requests if the power transmitter 101 supports a specific operating parameter (e.g. whether a specific function is supported or a specific value of a parameter (such as a power level)). This can for example be a request for the power transmitter 101 to support a certain power level, communication mode, etc.

In response to receiving the request, the power transmitter 101 in step 603 evaluates whether it can support the requested operating parameter (value). If so, the power transmitter 101, proceeds to generate and transmit (step 605) an accept message to the power receiver 105 and it further commits itself to support the operating parameter after establishing a new power transfer contract.

If the power receiver 105 receives an accept response within a certain time (step 605) it commits itself to apply the operating parameter after the establishment of a new power transfer contract.

If the power transmitter 101 does not support the requested operating parameter, it responds with a decline message in step 609. If the power receiver 105 receives a decline response (step 611), it commits itself to not use the requested operating parameter after the establishment of a new power transfer contract.

If the power transmitter 101 does not understand the request due to the request not being known by the power transmitter, the power transmitter responds (step 613) with a message indicating that the receiver response is not understood. If the power receiver receives such a response (step 615), it commits itself to not apply the requested operating parameter after the establishment of a new power transfer contract. Additionally the power receiver may avoid repeating such request in a later stage to avoid unnecessary communication.

If the power transmitter does not correctly receive a request due to a communication error, it will not send a response message (step 617). If a power receiver does not receive a response message within a given time, it will not apply the requested operating parameter, but it my repeat the request (step 619). In general, if a power receiver does not correctly receive a response message due to an error in the communication, it will not apply the operating parameter, but it may repeat the request.

The message accepting or rejecting the operating parameter by the power transmitter may be a simple one bit message or may be a multiple bit message e.g. including further information. For example, the message may indicate that the parameter is accepted, rejected, or not understood (which is also treated as a rejection). In some embodiments, the first message may further include an acknowledgement of the receipt of the message specifying the operating parameter. The message accepting or rejecting the operating parameter may further include redundant bits provided to increase the reliability of the communication. For example, redundant bits being part of an error code may be used (e.g. a simple repetition code may be used).

As a specific example, the message from the power transmitter 101 may be an eight bit message which includes an acknowledgement indication, as well as an indication of whether the parameter is accepted, rejected or not understood. Such information can clearly be communicated in less than eight bits but the redundant bits may be used to provide a more reliable detection. In particular, the use of redundant bits may increase the Hamming distance between the data symbols (8 bit combinations) corresponding to each option, thereby allowing correct detection even in the presence of bit errors.

The approach of using negotiation cycles with individual acknowledgements (accept/decline messages) allows for a very efficient approach which is furthermore particularly suitable for power transfer systems such as Qi power transfer systems. In particular, it maintains the design principle of the power receiver 105 being the master controller responsible for the selection of parameter settings. The approach furthermore minimizes the communication required from the transmitter and indeed can work with each negotiation cycle requiring only a single bit being communicated from the power transmitter 101 to the power receiver 105. Thus, only a very low data rate is required for communication from the power transmitter 101 to the power receiver 105. Thus, whereas the negotiation phase is based on a bidirectional communication, this communication may be asymmetric with a significantly higher data rate and complex data coding from the power receiver 105 to the power transmitter 101 than from the power transmitter 101 to the power receiver 105. Such an approach is particularly suitable for systems such as Qi as it can utilize the already standardized high data rate communication from the power receiver 105 to the power transmitter 101 while reducing the impact and changes required to introduce the communication from power transmitter 101 to power receiver 105.

In particular, it may enable amplitude modulation of the power signal to be detected using a very slow time constant. This can in particular allow the detection to be based on sensing the output voltage generated by the rectification and smoothing capacitor of the power transfer circuit. This can reduce component count and specifically can allow the same A/D converter to be used (without needing any switching circuitry).

It may also enable a simple and low cost frequency modulation and demodulation, e.g. by counting the zero crossings of the received signal and measuring the time elapse of a relatively large fixed amount of zero crossings without putting much performance requirements or added complexity to the power receiver and its control unit.

In the example, the communication from the power receiver 105 to the power transmitter 101 is by load modulation, i.e. by the power receiver 105 changing the loading of the power signal/transmitter coil such that the resulting (voltage and/or current) variations can be detected by the power transmitter 101. The communication from the power transmitter 101 to the power receiver 105 may be implemented any suitable communication but is typically implemented by the power transmitter 101 modulating the power signal. This modulation may typically be Amplitude Modulation (AM), Frequency Modulation (FM), or Phase Modulation (PM), but could also be other forms of modulation such as Pulse Width Modulation (PWM). Due to the efficient handshake cycle used by the negotiation cycles, a low data rate is sufficient and therefore reliable communication using simple detection circuitry can often be used.

As a specific example, the system may be based on AM modulation wherein the power transmitter 101 following receipt of a package from the power receiver 105 proceeds to change the amplitude (typically voltage amplitude) of the power signal. This may for example be done by the power transmitter 101 simply reducing the voltage of the transmitter coil signal by, say, 5%. This amplitude reduction may thus be achieved directly by changing the voltage, but could e.g. also be achieved by changing the frequency away from the resonance frequency of the tuned output circuit of the power transmitter 101 (which includes the transmitter coil).

The power receiver 105 may measure the voltage across the smoothing capacitor of the power transfer unit 317 (corresponding to the voltage over capacitor $C_L$ of FIG. 4). Due to the low time constant, this voltage will only slowly follow the voltage of the power signal (typically with a time constant in the order of a few msecs). However, as only a single bit needs to be communicated, the typical timings for Qi communications still allow the power receiver 105 to detect the signal within reasonable time.

The further set of operating parameters determined in the negotiation phase may as previously mentioned include modifying parameters that have already been determined in the configuration phase, or may include operating parameters that have not been, or cannot be, selected in the identification and configuration phase. Also, the negotiation phase may be entered a plurality of times, and operating parameters set in previous negotiation phases may be modified in subsequent negotiation phases.

As an example, the negotiation phase may negotiate the setting of a communication parameter for the communication between the power transmitter and the power receiver. The communication parameter may for example be a modulation parameter (such as modulation type, modulation depth etc.), a data rate parameter, an error control parameter etc. The communication parameter may apply to only one of the two directions (i.e. from the power transmitter 101 to the power receiver 105, or from the power receiver 105 to the power transmitter 101) or may apply to both directions.

As an example, the default modulation format for the communication from the power transmitter 101 to the power receiver 105 in the negotiation phase may be AM. However, a negotiation cycle may be instigated by the power receiver 105 sending a message requesting that FM (specifically Frequency Shift Keying (FSK)) is used going forward for transmissions from the power transmitter 101. If the power transmitter 101 can support FSK it transmits an accept message and proceeds to apply FSK from then on (or possible from the end of the negotiation phase). If the power transmitter 101 cannot support FSK it transmits a decline message and the communication continues to use AM.

In many embodiments, the operating parameters set in the negotiation phase include a power level parameter. Specifically, the identification and configuration phase may result in a power contract between the power receiver 105 and power transmitter 101 which allows the power receiver 105 to extract a maximum of 5 W (in accordance with the limitations of versions 1.0 and 1.1). However, in a subsequent negotiation phase, the power receiver 105 may send a request to increase the power level allocation to a higher value than supported by the identification and configuration phase. E.g. the power receiver 105 may request that it is allocated 10 W. If the power transmitter 101 can support this increased power level, it transmits an accept message and otherwise it transmits a reject message.

It will be appreciated that more complex power level parameters may be set. For example, the power level request may be associated with timing information. Thus, e.g. a power receiver 105 may request that it is allowed 5 W continuously with 10 W for 10% of the time (or e.g. in specified time intervals). Such additional information may allow a more precise power management, e.g. when a plurality of devices are simultaneously supported by the power transmitter 101.

The power level parameter may be a maximum rectified power level, which the power receiver (105) is intended to use.

Thereto the Qi standard will comprise a Request Maximum Power (0x04) packet, which may be defined e.g. as follows:

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | | Maximum Power | | | | |

In this the parameters are defined as follows:

Power Class This field contains an unsigned integer value that indicates the Power Receiver's Power Class.

Maximum Power Apart from a scaling factor, the unsigned integer value contained in this field indicates the maximum amount of power which the Power Receiver expects to provide at the output of the rectifier. This maximum amount of power is calculated as follows:

$$P_{max} = \left(\frac{\text{Maximum Power}}{2}\right) \times 10^{Power\ Class}\ W.$$

Instead of indicating power with 8 bit words, 16 bits may be used for higher precision.

If several packets communicate received power, there may be a further communication to the transmitter which communicated power should actually be used for configuring the power transfer.

The negotiation phase may be entered at different times and from different modes of operation of the power transfer system. In the previous example, the negotiation phase has been entered following the identification and configuration phase and thus has been entered when an initial power contract has been in place.

In many embodiments, the negotiation phase may be entered following the identification and configuration phase. This may specifically be achieved by the power receiver 105 transmitting a request to enter the negotiation phase (just) after the identification and configuration phase has completed, or indeed by the power receiver 105 transmitting the request as part of the identification and configuration phase with the devices then entering the negotiation phase when the identification and configuration phase completes. Thus, in these embodiments, the negotiation phase is entered between the identification and configuration phase and the power transfer phase.

In some embodiments, the negotiation phase may be entered following a request transmitted from the power receiver 105 in a packet which is part of the identification and configuration phase. For example, in Qi versions 1.0 and 1.1, the last message of the configuration phase has a number of reserved data bits. In accordance with some embodiments of the invention, one of these reserved data bits is used as a request to enter the negotiation phase following the identification and configuration phase.

Thus, in such embodiments, at the end of the configuration phase, the power receiver 105 indicates that it requests to enter the negotiation phase by setting a negotiation bit in the configuration packet. If the power transmitter 101 supports negotiation, it acknowledges the reception of the request and accepts the request by sending an accept message. This acknowledge/accept message may in some embodiments be transmitted following the configuration phase, i.e. in the time interval following the configuration phase and before the power transfer phase would otherwise begin. The power transmitter 101 then proceeds to enter the negotiation phase. If the power receiver 105 receives the accept messages within a certain time, it also proceeds to the negotiation phase.

In contrast to the identification and configuration phase, the negotiation phase is not mandatory but can be skipped. Thus, if the power receiver does not indicate that it requests to enter the negotiation phase at the end of the configuration phase (by resetting the appropriate negotiation bit in the configuration packet), both power receiver 105 and power transmitter 101 skip the negotiation phase and proceed directly to the power transfer phase. If the power receiver 105 requests the negotiation phase, but the power transmitter 101 does not support the negotiation phase, the power transmitter 101 acknowledges the reception of the request and informs the power receiver 105 of the rejection of the request by sending a reject message. The devices then proceed to the power transfer phase.

The approach allows for the power transfer phase to be entered with a suitable enhanced or basic power transfer contract as appropriate. Indeed, at the end of the configuration phase (before entering the negotiation phase), the power transmitter establishes a basic contract, which contains operating parameters as defined by the low power Qi Specification version 1.0 or 1.1. Power transmitters of version 1.0 and 1.1 do not support the power negotiation phase and do not respond to any request for power negotiation. In that case, the power transmitter will proceed directly to the power transfer, having the standard parameters of the identification phase. E.g. transmitted power may then be 5 Watt, but the new negotiation phase can change that with negotiating phase packets, e.g. specifying that the transmitted power should be 10 Watt instead, or confirming that it should be 5 Watt. Further, if the power receiver does not receive any accept or reject message within a certain time (response time which the transmitter should meet), the receiver may assume that the power transmitter does not support power negotiation and it proceeds to the power transfer phase. Also similarly, the transmitter may be a recent one which does support a negotiation phase, but may elect to fall back to a version 1 power transmission strategy (and associated communication strategy). Likewise, if the power receiver is a version 1.0 or 1.1 power receiver, no request to enter the negotiation phase is generated. In all these cases, the system goes directly from the identification and configuration phase to the power transfer phase, and thus the basic power transfer contract is applied.

This approach accordingly provides full backwards compatibility with versions 1.0 and 1.1 devices.

However, if both power receiver 105 and power transmitter 101 can support the configuration phase, this may be entered after the identification and configuration phase but before the power transfer phase. The negotiation phase uses the basic power transfer contract as a basis and can then modify this to provide a modified or enhanced power transfer contract. The power transfer phase is then entered using this enhanced power transfer contract.

In some embodiments, the power transfer system may alternatively or additionally support entering of the negotiation phase from the power transfer phase. Specifically, the power receiver can request to (re-)enter the negotiation phase from the power transfer phase by sending an end-power packet with an appropriate payload (where the payload is defined to provide an indication of a wish to re-enter the negotiation phase).

If the system enters the negotiation phase from the power transfer phase, the starting power transfer contract is the power transfer contract that is currently applied in the power transfer phase. If the negotiation phase has not previously been entered, this may be a basic power transfer contract. However, if the negotiation phase has been entered previously (e.g. between the identification and configuration phase and the power transfer phase), the power transfer contract can be an enhanced power contract.

The ability to enter the negotiation phase from the power transfer phase provides a very flexible system where the operation can be dynamically adapted to the specific requirements and preferences of the devices.

The negotiation phase may specifically be arranged to include a negotiation cycle only for the parameters that the power receiver 105 seeks to change. All other aspects of the power transfer contract thus remain unchanged. Such an approach allows for a low complexity and shortened negotiation phase.

In many embodiments, the power receiver 105 is arranged to only transmit the request to enter the negotiation phase, if it has established that the power transmitter 101 can support the negotiation phase.

Thus, the power receiver 105 may be arranged to determine whether the power transmitter supports a negotiation phase and to select whether to transmit the request to enter the negotiation phase dependent on whether the power transmitter supports the negotiation phase.

Such an approach may provide a more robust and reliable system and may provide improved backwards compatibility. In particular, existing Qi version 1.0 and 1.1 power transmitters will interpret unknown messages to result from an error situation and may therefore typically terminate the operation.

Problem on Re-Configuration:

Existing Qi versions 1.0 and 1.1 allow to re-enter the configuration phase from the power transfer phase and then keep the operation point unchanged during the configuration phase in order to seamlessly re-enter the power transfer phase without interruptions of power transfer. However in practice not many power transmitter supports this requirement. Many of them also simply stop power transfer when the power receiver communicates an end-power packet with the request for re-configuration set in the payload.

The use of re-configuration option will no longer be useful for existing power transmitter products in the market. A reconfiguration may e.g. be a change in internal setting of the receiver, such as e.g. going from half-bridge to full-bridge for higher power.

Solution for Re-Configuration:

This situation can be improved e.g. by assuming that all new power transmitters that support negotiation to have a function of re-configuration implemented, and they will be tested on this function. A power receiver would then be allowed to request the re-configuration option only after the system has entered the negotiation phase from the configuration phase, before power transfer phase.

Further embodiments enable a better option, by defining a negotiation cycle in the negotiation phase in which the power receiver explicitly requests whether the power transmitter supports re-configuration. This will leave no doubts and also allows better compliance testing of the power transmitter to check if it fulfills such requirement. So the transmitter and receiver will have a unit (typically software running on a processor) which will generate packets for the other side containing specific request as e.g. the examples described herein, and the units will be able to handle the responses received on those requests. The answers may e.g. be stored in a local memory. An answer to whether e.g. the transmitter (or receiver) can handle re-negotiation or re-configuration can be a simple yes or no, i.e. encoded in a single reserved bit. A request can also ask whether a transmitter supports a maximum power higher than in the currently used configuration packet, to which the answer can also be yes or no. In this manner one can have different powers agreed, e.g. a guaranteed maximum power for the current powering phase, but also what the transmitter could maximally transmit (possibly also variable, e.g. in the current setting or configuration, or at the current moment, etc.).

Re-Negotiation

The ability of the power transmitter to enter the negotiation phase from the power transfer phase could be realized implicitly, e.g. by allowing re-negotiation only after the system has entered the negotiation phase from the configuration phase before. An embodiment however also enables a better option, by defining a negotiation cycle in which the power receiver explicitly requests whether the power transmitter supports re-negotiation. This will leave no doubts and also allows better compliance testing of the power transmitter to check if it fulfills such requirement Both requests from the receiver, whether the power transmitter supports re-configuration and whether a power transmitter supports re-negotiation can be bundled in a single request whether the transmitter supports re-configuration and re-negotiation.

The option for re-negotiation is of particular advantage for the following situation. A power transmitter may have an inverter that can operate in two modes: half-bridge and in full-bridge. Depending on the situation the power transmitter may change its operation from half-bridge to full bridge and vice versa. Half-bridge operation could be required for power receivers that are designed according to Qi v1.0 and v1.1 to keep the rectified voltage of such power receiver below a maximum limit. Full-bridge operation could be required for power receivers designed for a future version of Qi allowing an increased power level, to keep the rectified voltage of such new higher level power receiver above a minimum limit.

By negotiating the guaranteed power level, the power transmitter could determine which operation mode, half- or full-bridge is appropriate. A power receiver designed to receive a high power level will request a high guaranteed power level in a negotiation cycle. On such request the power transmitter could change its operation mode from the default half-bridge mode to full-bridge mode when entering the power transfer mode in order to achieve sufficient high voltage at the receivers rectifier output.

In case a power receiver reduces the required power level during the power transfer phase, e.g. because the battery is almost charged, the power transmitter may have to transit from full-bridge to half-bridge. In this case it is very useful when the power receiver re-enters the negotiation phase from the power transfer phase by means of a re-negotiation request and indicates with a negotiation cycle that it needs a lower guaranteed power level and then return to the power transfer phase. Based on this request in this (short) re-negotiation phase, the power transmitter can change its operation mode from full-bridge to half-bridge while re-entering the power transfer phase to prevent exceeding the maximum limit of the rectified voltage of the power receiver. Moreover will the power receiver be aware of such transition, because it has initiated the request for a lower guaranteed power level and expects a transition at the end of the (re-) negotiation phase. If unaware, so in case no re-negotiation would be applied, the power receiver may want to terminate power transfer due to an unexpected change of the power level during the transition from full-bridge to half-bridge operation while in the power transfer phase.

A further advantage of the ability to re-negotiate a lower guaranteed power level can be found in the situation that multiple power transmitters have to share a single power source. This situation can particularly occur in e.g. public transport where a single limited power source needs to power many power transmitters. In such situation only part of the need of all power requesting power receivers may be fulfilled. Re-negotiation of the guaranteed power level allows than to reduce the power level for power receivers of which the appliance has almost charged their battery to make more power available for power receiver of which appliance suffer from an almost empty battery. E.g. such transmitters may comprise communication units to communicate with other transmitters as to what power requirements they need (i.e. the receivers being powered by them), and then decide between each other on optimal powering situation. This can be incorporated in a re-negotiation phase, in which a receiver (or even a user of the receiver via input means) can indicate it can go with less power currently.

In an embodiment the receiver may use a specific TX request packet to request that the transmitter supplies a guaranteed power level.

It will be appreciated that different approaches for detecting the suitability of the power transmitter may be used. For example, in some embodiments, capable power transmitters may in response to a message from the power receiver during the identification and configuration phase, change the power level slightly. This change may occur during the time intervals between the data messages from the power receiver. Thus, in such embodiments, a short and small amplitude reduction (or increase) is used by the power transmitter to indicate that it is capable of bidirectional communication and of supporting the negotiation phase.

As a specific example, during the identification and configuration phase, the power receiver transmits an identification message which includes an indication of the Qi Specification version supported by the power receiver (e.g. it may indicate that it is a version 2.0 compatible power receiver). If the power transmitter is capable of supporting the associated functionality (e.g. if it can support version 2.0, typically corresponding to the power transmitter being a version 2.0 or newer device), it temporarily changes the amplitude.

The power receiver may accordingly monitor the power signal in-between the messages being communicated to the power transmitter, and if a change is detected the power receiver considers the power transmitter to support the negotiation phase, and it may accordingly transmit a request to enter the negotiation phase at a later stage.

It will be appreciated that different approaches can be used to terminate the negotiation phase.

Indeed, the number of negotiation cycles may vary depending on how many parameters the power receiver 105 wants to negotiate (and possibly depending on the responses of the power transmitter 101).

In some embodiments, the power receiver 105 may transmit a negotiation phase termination message when it is satisfied with the negotiated power transfer contract. Upon receiving the negotiation phase termination message, the power transmitter 101 will terminate the negotiation phase and move on to the power transfer phase. In some embodiments, the power transmitter may acknowledge the receipt of the negotiation phase termination message. In such embodiments, the power receiver 105 may at intervals repeat the negotiation phase termination message until an acknowledgement is received (or a time out occurs). It will then move on to the power transfer phase. In other embodiments, it may move straight to the power transfer phase after having transmitted the negotiation phase termination message.

As a specific example, the power receiver will typically want to enter the power transfer phase after zero or more negotiation cycles. In that case the power receiver sends a negotiation phase termination message (a negotiation complete request) to the power transmitter indicating that the power negotiation has completed. When receiving the negotiation phase termination message, the power transmitter establishes a power transfer contract based on the previous contract, but modified by the parameters negotiated in the negotiation cycles of the negotiation phase. The power transmitter indicates that it accepts the negotiation phase termination message by sending an accept message. It then starts applying the committed operating parameters and proceeds to the power transfer phase. If the power receiver receives the accept message, it starts applying the committed operating parameters and proceeds to the power transfer phase.

If the power transmitter for some reason does not want to establish a new power transfer contract based on the current parameters, it responds with a decline message and remains in the negotiation phase. If the power receiver receives a decline response, it remains in the power negotiation phase. The power receiver may then try repair the situation by re-negotiation, or it may leave the negotiation phase without a modified power contract.

If the power transmitter does not correctly receive the negotiation phase termination message due to a communication error, it will not send a response message. If a power receiver does not receive a response message, it remains in the power negotiation phase, but it may repeat the negotiation phase termination message. If a power receiver does not correctly receive a response message due to an error in the communication, it remains in the power negotiation phase, but it my repeat the negotiation phase termination message.

In case the power receiver does not want to proceed to the power transfer phase, the power receiver may send a dedicated power-end message packet. In response to receiving such a packet, the power transmitter leaves the negotiation phase and returns to a stand-by phase which for the Qi system corresponds to the selection phase. Thus, the power receiver may send a dedicated message during the negotiation phase which not only terminates the negotiation phase but terminates the entire power transfer set-up process. The power receiver may specifically determine that the set of parameters that can be negotiated with the power transmitter is insufficient for the operation of the power receiver (e.g. it cannot obtain the power level it desires) and it may accordingly abandon the process.

Furthermore, in some embodiments and scenarios, the power transmitter 101 may receive a power control error message when in the negotiation phase. These power control error messages are used in the power transfer phase to operate a power control loop for the power transfer. They are specifically generated by the power receiver 105 to control the power signal to be at the desired operating point.

If the power transmitter receives a power control error message when in the negotiation phase, it moves directly to the power transfer phase. Furthermore, the power transmitter will in many embodiments discard the changes that were introduced during the negotiation phase, and will enter the power transfer phase with the power contract that was in place prior to the negotiation phase being entered.

This approach may for example be used by the power receiver to enter the power phase very quickly (e.g. if a user starts operating the power receiver). In such a case, the power receiver may simply send a power control error message and directly move into the power transfer phase. Upon receiving the power control error message, the power transmitter will also move straight into the power transfer phase.

Thus, in case the power receiver quickly wants to proceed to the power transfer phase, it may send a control error packet. Both power transmitter and power receiver will immediately proceed to the power transfer phase after the communication of the control error packet without establishing a new power transfer contract, thereby leaving the previously established power transfer contract unchanged.

The approach may furthermore address a possible error situation. For example, if an error results in the power transmitter being in the negotiation phase whereas the power receiver is in the power transfer phase, the power receiver will transmit a power control error message as part of the standard procedure when in the power transfer phase. This will then automatically cause the power transmitter to also move into the power transfer phase thereby rectifying the situation.

Such a scenario may possibly arise if the power receiver requests negotiation and the power transmitter supports negotiation, but the power receiver does not receive the accept message correctly or in time. In this case, the power receiver may enter the power transfer phase while the power transmitter will enter the negotiation phase. This is an unwanted situation.

If the power receiver does not suspect that any communication error has occurred, it will proceed in accordance with the requirements for the power transfer phase and accordingly it must transmit control error packets. If the power transmitter, while being in the negotiation phase, receives a control error packet, it will proceed to the power transfer phase without negotiation.

If the power receiver does suspect a communication error, e.g. by detecting some response with errors or a late response, it may instead return to the identification and configuration phase from the power transfer phase by sending an end of power packet with a request for re-configuration. The power transmitter and power receiver will then re-enter the configuration phase. This enables a second try for entering the negotiation from the configuration phase.

If for some unknown reason, the power transmitter enters the power transfer phase while the power receiver enters the configuration phase, the power transmitter will terminate power transfer if it does not receive a control error packet within a certain time. A power receiver in negotiation mode will not send a control error packet unless it wants to enter the power transfer phase. Thus, in this case the process will automatically be terminated and may be reinitialized by the receiver.

Figure 7:
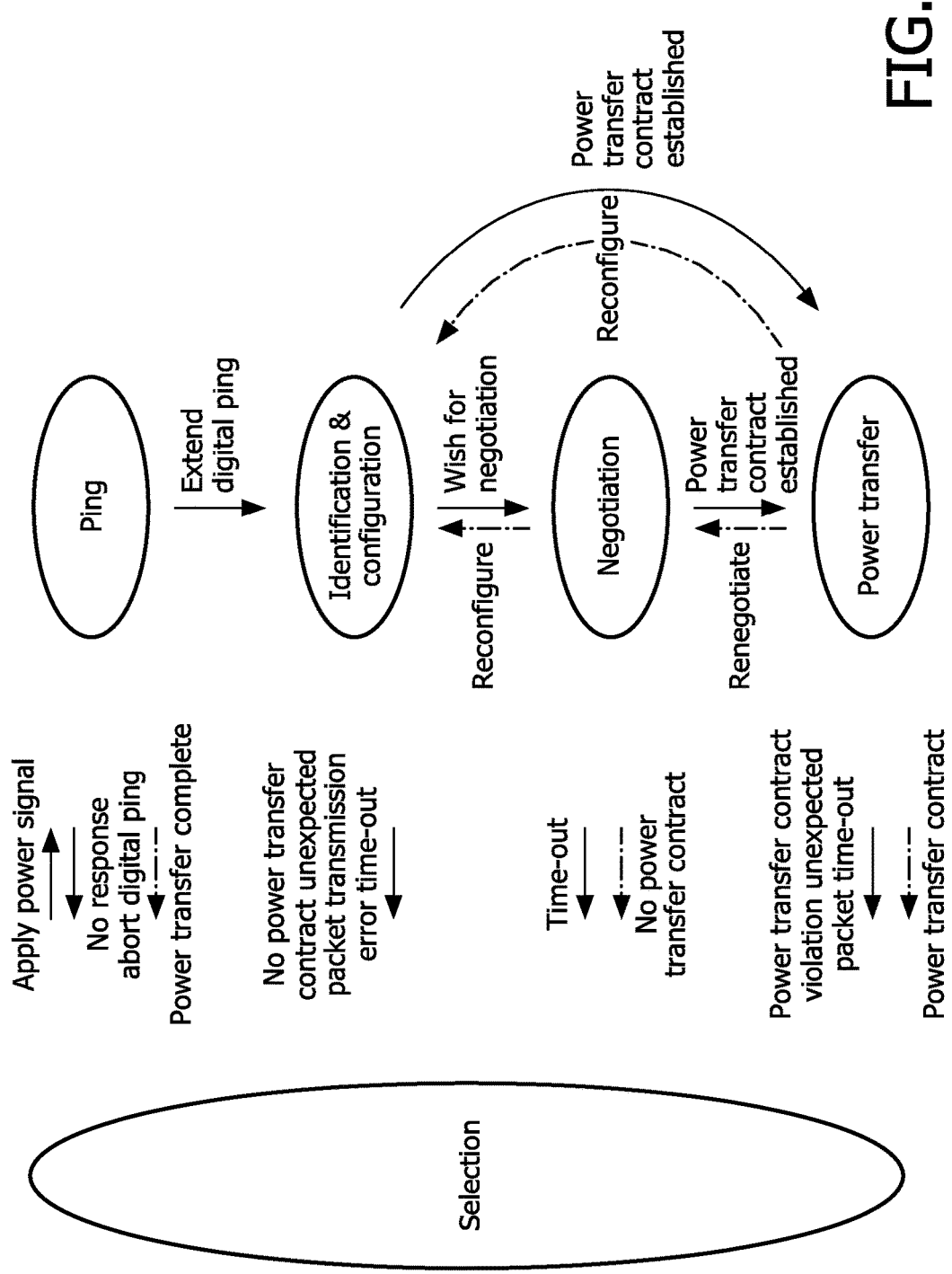
FIG. 7 illustrates an example of elements of a method of operation for a power transfer system in accordance with some embodiments of the invention.

An example of the operation and interworking of the different phases when applied to a Qi system is illustrated in FIG. 7.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

Furthermore the negotiation phase can conveniently be used for coordinating between receiver and transmitter which advanced options are available, such as e.g. whether and possibly with further information how a power transmitter or receiver is allowed to reconfigure during a powering. This should go smoothly. If it was preagreed during the first negotiation, either transmitter or receiver could start such a request, and then a chain of next process states and processing will occur, whether standard predefined, or agreed during the first negotiation. The same principle can be used to start an entire new negotiation, so that full options are available. E.g., the first negotiation could have been a quick one with communication of a minimal number of essential parameters, so that powering could quickly start. In the mean time a lot of extra information could have been collected (e.g. a user may have indicated he needs to take away his receiver more urgently, or a transmitter may have negotiated powering contracts with several other apparatuses, or the receiver may have done excessive testing of its batteries, or either receiver or transmitter may have tested or measured other relevant parameters), and then if necessary a more in-depth negotiation phase can be started.

E.g. to enable the above options a future Qi or similar power transfer standard may comprise a packet called "Check on TX support for re-configuration and re-negotiation (0x06)", which may be defined as follows:

| $b_7$ | $b_6$ | $b_5$ | $b_4$ | $b_3$ | $b_2$ | $b_1$ | $b_0$ |
|---|---|---|---|---|---|---|---|
| $B_0$ | ReConf | ReNeg | | | | | |

ReConf If this bit is set to ONE, the power receiver checks if the power transmitter supports re-configuration. Section 6.3.2 describes how a power receiver can indicate for re-configuration.

ReConf If this bit is set to ONE, the power receiver checks if the power transmitter supports re-negotiation. Section 6.3.2 describes how a power receiver can indicate for re-negotiation.

A Specific TX Request Packet (0x020) may be:

| Request | Command Type | Data | Expected TX Response |
|---|---|---|---|
| 0x00 | End Negotiation | Change count | ACK/NAK and apply power transfer contract values |
| 0x01 | Request Guaranteed Power | Power Class and Level | ACK/NAK and commit to power transfer contract |
| 0x02 | Select Received Power Packet | Header indicating which Received Power Packet to use. | ACK/NAK and commit to power transfer contract |
| 0x03 | TX Modulation Depth Request | Modulation polarity and depth | ACK/NAK and commit to power transfer contract |
| 0x04 | Request Maximum Power | Power Class and Level | ACK/NAK and commit to power transfer contract |
| 0x05 | Check on support for re-configuration re-negotiation | ReConf and ReNeg bits | ACK/NAK and commit to power transfer contract |
| 0x06-0xFF | Reserved | | |

The invention can be implemented in any suitable form including hardware, software, firmware or any combination of these. In particular the controller implementing the control strategy and the flow of process steps, and all its means or physical or functional units, may be physically implemented e.g. as software running on a generic processor, or a dedicated ASIC, like e.g. a processor comprising a state machine, etc. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors. It should be clear to the skilled person that all options that we have described with system configurations or method embodiments can also be realized in corresponding versions of transmitters or receivers, and are thereby similarly disclosed.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method of operation for an inductive power transfer system comprising a power transmitter arranged to generate a wireless power signal for a power receiver, the inductive power transfer system supporting two-way communication between the power transmitter and the power receiver based on modulation of the power signal, the method comprising:
   initiating, by the power receiver, a mandatory configuration phase by transmitting a signal strength package to the power transmitter;
   wherein the power transmitter and the power receiver operate in the mandatory configuration phase, and a first set of power transfer operating parameters are selected for the power transmitter and the power receiver;
   transmitting, by the power receiver, a request to enter a requested negotiation phase;
   acknowledging, by the power transmitter, the request to enter the requested negotiation phase by transmitting an acknowledgement to the power receiver, the acknowledgement being indicative of an acceptance or a rejection of the request to enter the requested negotiation phase;

entering, by the power transmitter, the requested negotiation phase in response to receiving the request to enter the requested negotiation phase;

entering, by the power receiver, the requested negotiation phase in response to receiving the acknowledgment from the power transmitter if the acknowledgement is indicative of the acceptance of the request to enter the requested negotiation phase;

determining, by the power receiver and power transmitter, a second set of operating parameters by performing the requested negotiation phase.

2. The method of claim 1, wherein the power receiver transmits the request to enter the requested negotiation phase during a power transfer phase.

3. The method of claim 1, wherein the power receiver transmits the request to enter the requested negotiation phase prior to entering a power transfer phase.

4. The method of claim 1, wherein the configuration phase includes the power receiver determining whether the power transmitter supports a negotiation phase, and the power receiver selects whether to transmit the request to enter the requested negotiation phase dependent on the determination of whether the power transmitter supports the negotiation phase.

5. The method of claim 1, wherein the second set of operating parameters comprises a communication parameter for the communication between the power transmitter and the power receiver.

6. The method of claim 1, wherein the second set of operating parameters comprises a power level parameter for a power transfer from the power transmitter to the power receiver.

7. The method of claim 6, wherein the set of operating parameters comprises a guaranteed power level which the transmitter should transmit.

8. The method of claim 6, wherein the power level parameter is a maximum rectified power level.

9. The method of claim 1, wherein the second set of operating parameters comprises an indication whether the power transmitter supports transition from power transfer phase to configuration phase using a re-configuration request.

10. The method of claim 1, wherein the second set of operating parameters comprises an indication whether the power transmitter supports transition from power transfer phase to negotiation phase by means of a re-negotiation request.

11. The method of claim 1, wherein, when in the negotiation phase, the power receiver and power transmitter determine the second set of parameters in a number of negotiation cycles, each negotiation cycle comprising the power receiver transmitting a message specifying an operating parameter and the power transmitter responding with a message accepting or rejecting the operating parameter.

12. The method of claim 1, wherein, when in the negotiation phase, the power transmitter proceeds to a power transfer phase in response to receiving a power control error message from the power receiver.

13. The method of claim 1, wherein, when in the negotiation phase, the power receiver transmits a negotiation phase termination message, and the power transmitter terminates the negotiation phase and enters a power transfer phase in response to receiving the negotiation phase termination message.

14. The method of claim 1, wherein, when in the negotiation phase, the power receiver transmits a power-end message in response to a determination that the second set of parameters does not meet the power receivers requirements, and the power transmitter is arranged to terminate the negotiation phase and return to a stand-by phase in response to receiving the power-end message.

15. The method of claim 1, wherein, when in the negotiation phase, the power receiver transmits a power control error message and enters a power transfer phase after discarding parameter changes introduced by the negotiation phase, and the power transmitter terminates the negotiation phase and enters the power transfer phase after discarding parameter changes introduced by the negotiation phase in response to receiving the power control error message.

16. The method of claim 1, wherein the request to enter the requested negotiation phase is comprised in a message of the configuration phase.

17. The method of claim 1, wherein the mandatory configuration phase is performed in accordance with the specifications of the Qi power transfer standard version 1.0 or 1.1.

18. A method of operating a power transmitter of an inductive power transfer system comprising the power transmitter generating a wireless power signal for a power receiver, the inductive power transfer system supporting two-way communication between the power transmitter and the power receiver based on modulation of the power signal, the method comprising:

receiving a signal strength package from the power receiver initiating a mandatory configuration phase;

operating the mandatory configuration phase, wherein a first set of power transfer operating parameters are selected for the power transmitter and the power receiver;

receiving a request to enter the requested negotiation phase from the power receiver;

acknowledging the request to enter the requested negotiation phase by transmitting an acknowledgement to the power receiver, the acknowledgement being indicative of an acceptance or a rejection of the request to enter the requested negotiation phase;

entering the requested negotiation phase in response to receiving the request to enter the requested negotiation phase; and operating the requested negotiation phase wherein a second set of power transfer operating parameters are selected for the power transmitter and the power receiver.

19. A method of operating a power receiver of an inductive power transmission system comprising a power transmitter generating a wireless power signal for the power receiver, the power transmission system supporting two-way communication between the power transmitter and the power receiver, the two-way communication being based on modulation of the power signal, the method comprising:

initiating a mandatory configuration phase by transmitting a signal strength package to the power transmitter;

operating the mandatory configuration phase, wherein a first set of power transfer operating parameters are selected for the power transmitter and the power receiver;

transmitting a request to enter the requested negotiation phase;

entering the requested negotiation phase in response to receiving an acknowledgment message from the power transmitter indicative of an acceptance of the request to enter the requested negotiation phase;

operating the requested negotiation phase wherein a second set of power transfer operating parameters are selected for the power transmitter and the power receiver.

20. An inductive power transfer system, comprising:
a power transmitter and a power receiver, the power transmitter being arranged to generate a wireless power signal for the power receiver and the inductive power transfer system being arranged to support two-way communication between the power transmitter and the power receiver based on modulation of the power signal, and wherein
the power receiver is arranged to initiate a mandatory configuration phase by transmitting a signal strength package to the power transmitter;
the power transmitter and the power receiver are arranged to operate the mandatory configuration phase, wherein a first set of power transfer operating parameters are selected for the power transmitter and the power receiver;
the power receiver is arranged to transmit a request to enter a requested negotiation phase;
the power transmitter is arranged to acknowledge the request to enter the requested negotiation phase by transmitting an acknowledgement to the power receiver; the acknowledgement being indicative of an acceptance or a rejection of the request to enter the requested negotiation phase;
the power transmitter is arranged to enter the requested negotiation phase in response to receiving the request to enter the requested negotiation phase;
the power receiver is arranged to enter the requested negotiation phase in response to receiving the acknowledgment from the power transmitter if the acknowledgement is indicative of the acceptance of the request to enter the requested negotiation phase; and
the power receiver and power transmitter are arranged to determine a second set of operating parameters by performing the requested negotiation phase.

21. A power transmitter for an inductive power transfer system, the inductive power transfer system supporting two-way communication between the power transmitter and a power receiver based on modulation of a power signal, the power transmitter
generating the power signal;
receiving a signal strength package from the power receiver initiating a mandatory configuration phase;
operating the mandatory configuration phase wherein a first set of power transfer operating parameters are selected for the power transmitter and the power receiver;
receiving a request to enter the requested negotiation phase from the power receiver;
acknowledging the request to enter the requested negotiation phase by transmitting an acknowledgement to the power receiver; the acknowledgement being indicative of an acceptance or a rejection of the request to enter the requested negotiation phase;
entering the requested negotiation phase in response to receiving the request to enter the requested negotiation phase; and
operating the requested negotiation phase, wherein a second set of power transfer operating parameters are selected for the power transmitter and the power receiver.

22. A power receiver of an inductive power transmission system comprising a power transmitter generating a wireless power signal for the power receiver, the power transmission system supporting two-way communication between the power transmitter and the power receiver based on modulation of the power signal, the power receiver comprising a receiver controller
initiating a mandatory configuration phase by transmitting a signal strength package to the power transmitter;
operating the mandatory configuration phase wherein a first set of power transfer operating parameters are selected for the power transmitter and the power receiver;
transmitting a request to enter a requested negotiation phase;
entering the requested negotiation phase in response to receiving an acknowledgment message from the power transmitter if the acknowledgement is indicative of an acceptance of the request to enter the requested negotiation phase;
operating the requested negotiation phase, wherein a second set of power transfer operating parameters are selected for the power transmitter and the power receiver.

23. The power receiver as claimed in claim 22, wherein the receiver controller enters a power transfer phase set up based upon the first set of power transfer operating parameters in case no acknowledgement was received within a predetermined response time.

* * * * *